May 10, 1949.  J. D. MACKIN ET AL  2,470,040
COLLAPSIBLE PERAMBULATOR
Filed June 29, 1945  4 Sheets-Sheet 1

INVENTOR
James D. Mackin
Ericke W. Bergmann
BY
Joseph Farley
ATTORNEY

May 10, 1949.  J. D. MACKIN ET AL  2,470,040
COLLAPSIBLE PERAMBULATOR
Filed June 29, 1945  4 Sheets-Sheet 2
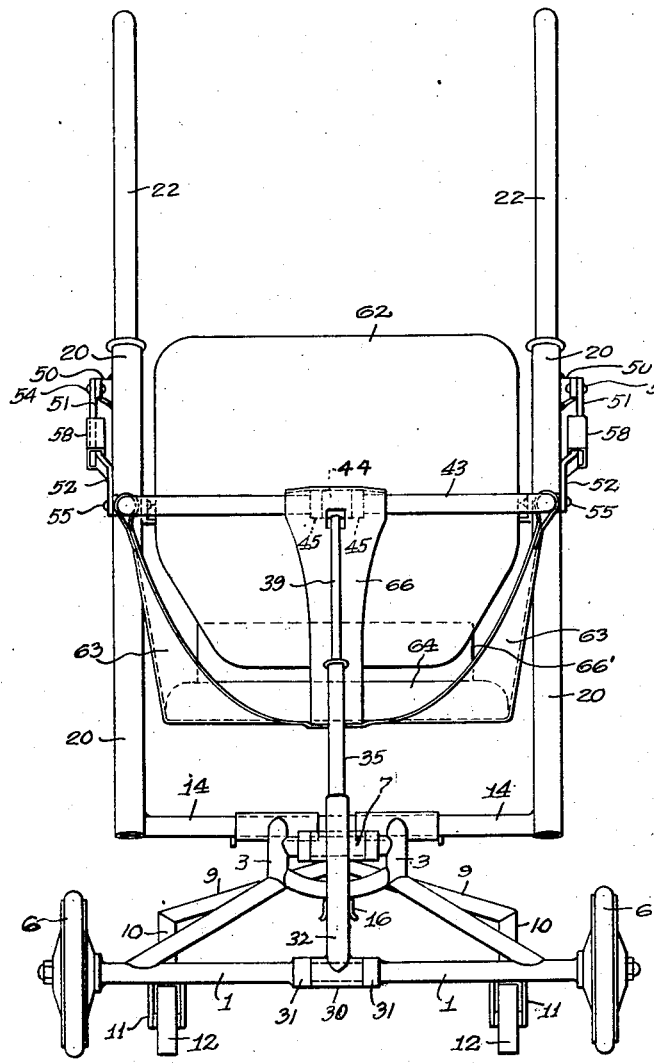
Fig. 2.
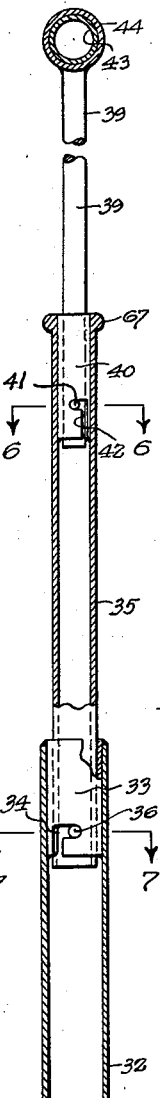
Fig. 5.
Fig. 6.  Fig. 7.
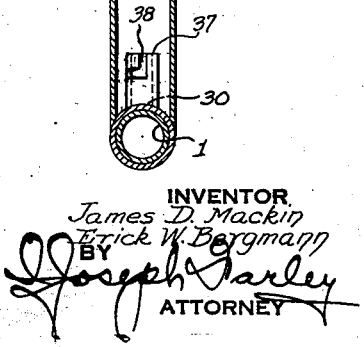
INVENTOR.
James D. Mackin
Erick W. Bergmann
BY Joseph Farley
ATTORNEY May 10, 1949.  J. D. MACKIN ET AL  2,470,040
COLLAPSIBLE PERAMBULATOR Filed June 29, 1945  4 Sheets-Sheet 3

INVENTOR
James D. Mackin
Erick W. Bergmann
BY Joseph Varley
ATTORNEY

May 10, 1949.  J. D. MACKIN ET AL  2,470,040
COLLAPSIBLE PERAMBULATOR
Filed June 29, 1945  4 Sheets-Sheet 4
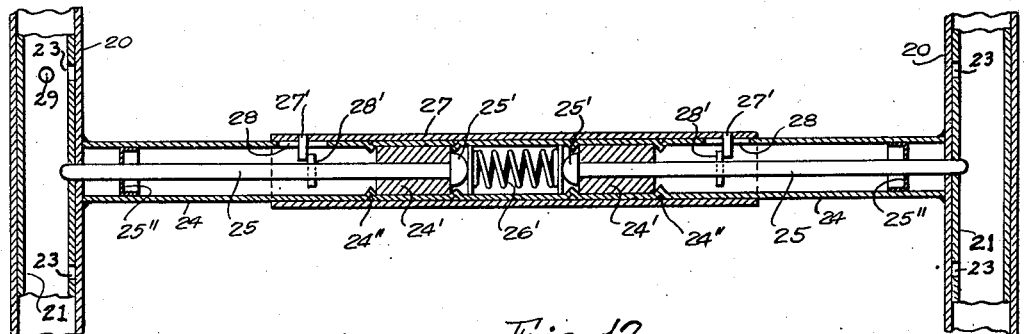
Fig. 12.
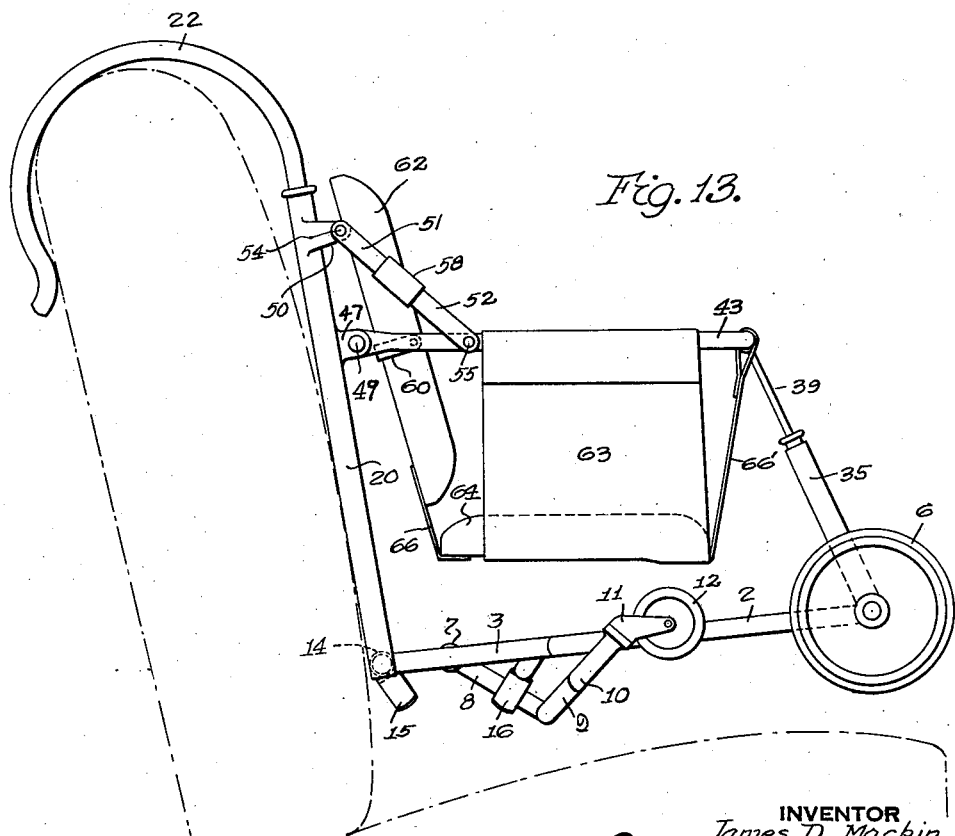
Fig. 13.
INVENTOR
James D. Mackin
Erich W. Bergmann
BY
ATTORNEY Patented May 10, 1949

2,470,040

UNITED STATES PATENT OFFICE 2,470,040

COLLAPSIBLE PERAMBULATOR

James D. Mackin and Erick W. Bergmann, Monroe, Mich.; said Mackin assignor to said Bergmann Application June 29, 1945, Serial No. 602,190

18 Claims. (Cl. 280—41)

The present invention pertains to a novel collapsible perambulator designed to assume, when not in use, a compact form suitable for shipping and storage. The principal object of the invention is to provide a collapsible device of this character constructed of comparatively few and simple parts and adjustable from the extended to the collapsed position and vice versa by simple manipulation.

As in the conventional perambulator, the device disclosed herein is provided with a handle bar structure extending rearwardly from the body. Another object of the invention is to provide means for displacing the handle bar structure laterally into the general plane of the collapsed vehicle body.

Still another object of the invention is to provide a collapsible perambulator that is easily adapted to serve as an infant's seat in an automobile. By an independent operation, the rear wheel assembly may be swung around to extend forwardly of its pivotal attachment to the bottom frame and substantially with the margins of the collapsed vehicle body. In this connection the collapsed assemblies of the bottom structure are designed so that they can be swung slightly upward toward the seat of the perambulator without disturbing the seat, thereby permitting the bottom structure to clear the seat of the automobile. The handle bar structure is curved rearwardly so that it hooks over the back of the automobile seat and thus fixes the position of the infant's seat.

In the accomplishment of these and other objects of the invention, the perambulator includes a front wheel axle to which is pivotally attached a rearwardly extending bottom frame. A post structure is pivotally attached to the rear part of the bottom frame and extends upwardly therefrom, while a collapsible forward prop is pivotally attached to the front axle and also extends upwardly therefrom. Between the post structure and the forward prop is supported an upper frame, pivotally connected to both parts, and a seat is supported by the upper frame.

The rear wheel assembly is pivotally attached to the bottom frame and extends rearwardly in the operative position of the device. In collapsing the perambulator, the front axle is pushed upwardly and rearwardly toward the post structure, thereby swinging the bottom and upper frames and also the collapsed forward prop toward the rear post structure. This movement is permitted by reason of the pivotal connection of the several parts to each other as already set forth.

The aforementioned curved or hooked handle bars are rotatably mounted in the post structure. Consequently, they may be swung inwardly to each other to lie flat against the collapsed vehicle body. Locking means are provided for holding the handles in the rearwardly extended operative position and in the collapsed position.

The above and other objects of the invention will appear more fully from the more detailed description and by reference to the accompanying drawings forming a part hereof and wherein:

Fig. 2 is a front elevation;

Fig. 3 is a section on the line 3—3 of Fig. 1, showing the seat arrangement only;

Fig. 5 is a longitudinal section, partly an elevation, of the telescopic forward prop in fully extended condition;

Figure 11:
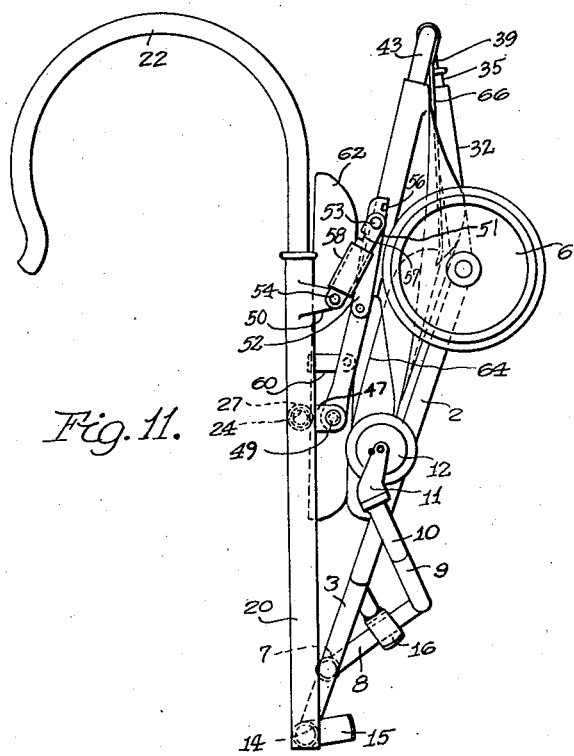
Figure 10:
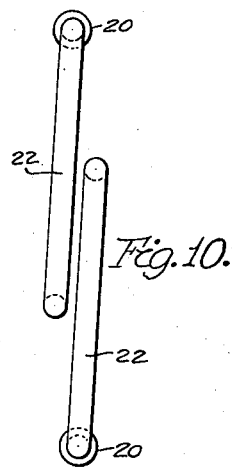

Figs. 6 and 7 are sections on the lines 6—6 and 7—7, respectively, of Fig. 5;

Fig. 8 is a detail plan view, partly in section;

Fig. 9 is a side elevation thereof;

Fig. 10 is a detail plan view showing the overlapping relation of the handle bars in collapsed condition;

Fig. 11 is a side elevation of the device in collapsed condition, with the handle bars in operating position;

Fig. 12 is a longitudinal section of the cross brace, and

Fig. 13 is an elevation of the device in an intermediate collapsed position.

Reference to these views will now be made by use of like characters which are employed to designate corresponding parts throughout.

Figure 1:
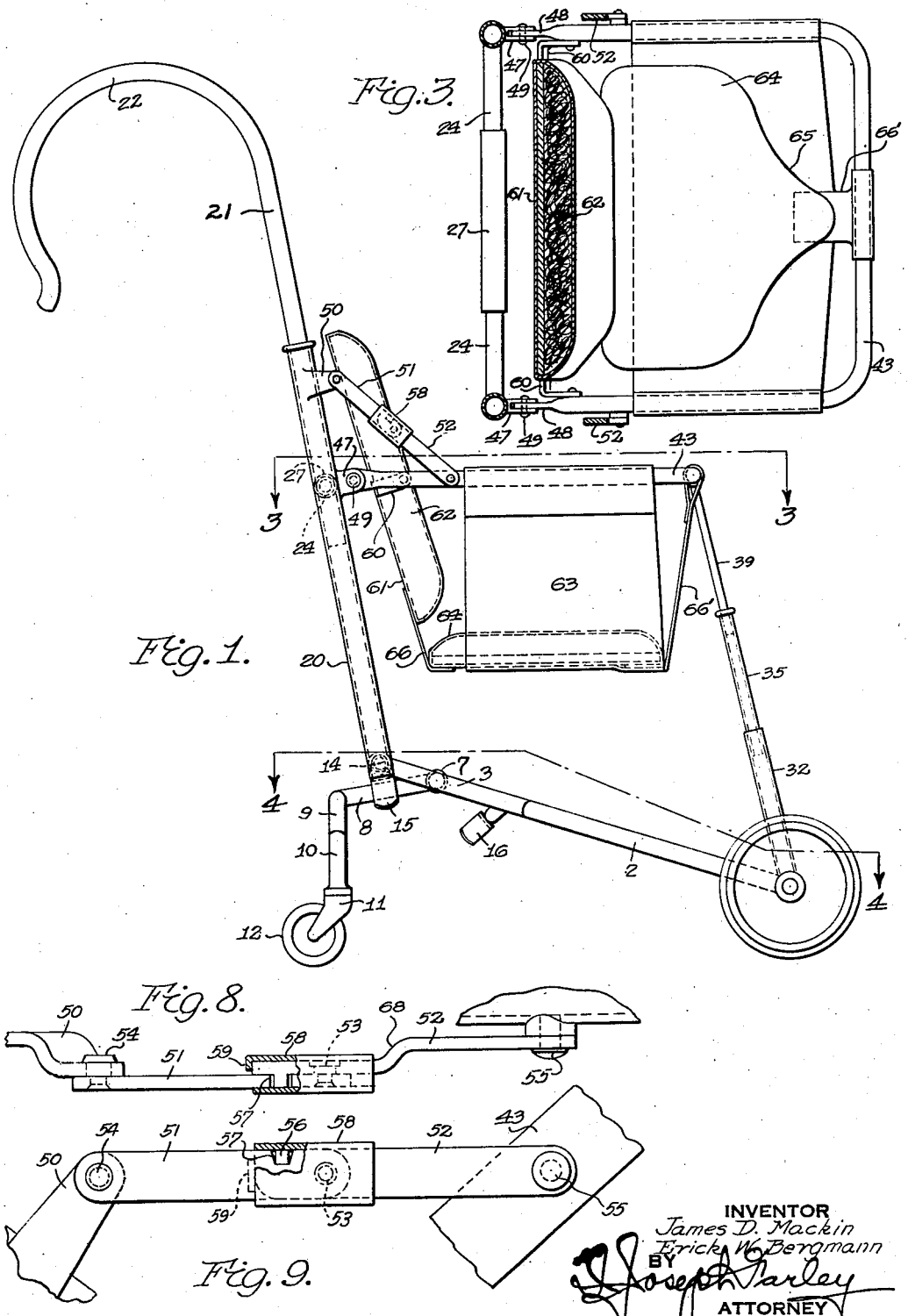
Fig. 1 is a side elevation of the device in condition for use.
Figure 4:
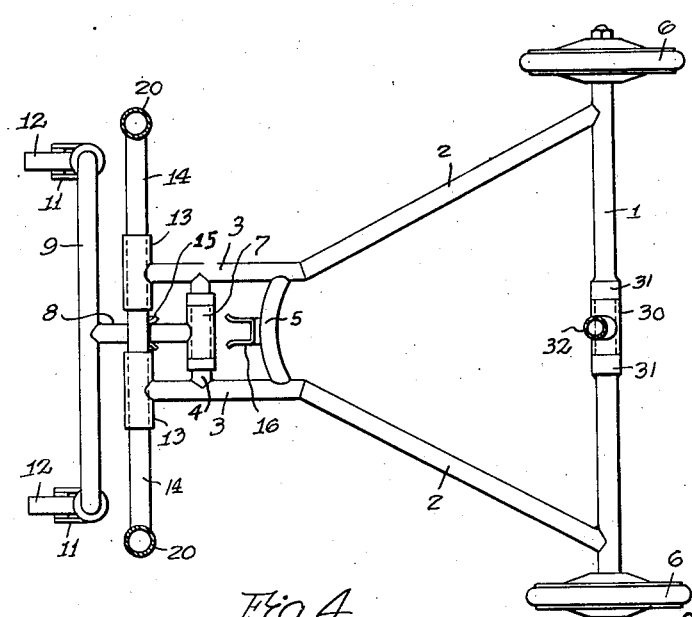
Fig. 4 is a section on the line 4—4 of Fig. 1.

The bottom frame structure that carries the wheels and supports the upper structure is best shown in Figs. 1, 2 and 4. The bottom structure includes a forward axle 1 to which are attached the divergent ends of a Y frame comprised of a pair of angular bars or rods 2 having their respective rearward portions 3 lying spaced apart and parallel to each other, as shown in Fig. 4. The portions 3 are joined by a straight cross piece 4 and a curved cross piece 5 which completes the Y frame, as illustrated in Fig. 4. The forward wheels 6 are mounted on the ends of the forward axle 1.

On the cross piece 4 is pivotally mounted a sleeve 7 carrying a downwardly and rearwardly extending arm 8. The free end of the arm 8 carries a transverse cross bar 9, and the ends of the latter carry legs 10 that depend vertically therefrom in the operative position shown in Fig. 1. The lower ends of the legs 10 carry caster forks 11 in which are mounted casters or rear wheels 12.

The free or rear ends of the parts 3 are formed with aligned sleeves 13 (Fig. 4) in which is secured another cross member 14 extending outwardly slightly beyond the legs 10. The member 14 carries a downwardly extending clip 15 positioned to receive the arm 8 in the position shown in Fig. 1. Forward of the bracket 7, the downwardly bowed cross piece 5 carries a similar clip 16 for receiving the arm 8 when swung forward on its pivot in collapsing the device partially or completely, as will presently be shown.

Each end of the cross member 14 rigidly carries an upwardly extending tubular post 20 inclined somewhat rearwardly as may be seen in Fig. 1. Each post 20 receives through its upper end the straight shank portion 21 of a handle bar having its upper end curved or hooked to form a handle portion 22. Each shank 21 is formed with a series of spaced and longitudinally aligned notches 23 adapted to receive selectively a locking mechanism that will now be described.

A cross brace 24 is secured to and between the posts 20 at about the upper seat level. Within this member are assembled a pair of wood or other suitable bushings 24' near the center thereof and slidably receiving pins 25 receivable selectively in the notches 23 of the respective handles 21. The heads 25' on the inner ends of the pins are engaged by washers 26 between which is inserted a compressed coil spring 26'. The bushings 24' are retained by any suitable means such as crimping of the bar 24, as indicated by the numeral 24''. The pins 25 may be further supported by metal bearing cups 25'' secured in the brace 24 near its ends.

The spring 26' tends to lock the pins 25 in the handles 21. The release is effected by a sleeve 27 slidably mounted on the member 24 and provided at its ends with pins 27' slidably received in slots 28 cut in the member 24. The pins 27' engage washers 23' fixed respectively on the pins 25 inwardly of the pins 27'.

This construction enables both handles to be released with one hand while the other hand is used to rotate the released handle. In operation the sleeve 27 is moved first in one direction to release one of the pins 25 from its handle and then in the other direction to release the other pin 25.

In collapsing the device into a compact form, as will presently be described in detail, it is desirable to turn the handles 90° and lock them in that position. For this purpose each shank 21 is formed with an aperture 29 at the level of the upper notch 23 and spaced 90° therefrom. On withdrawal of the pin 25 the handle can be turned 90° to bring the aperture 29 into register with the pin and locked in that position by inserting the pin in the aperture 29.

At substantially the center of the axle 1 is rotatably mounted a sleeve 30 between a pair of collars or bosses 31 suitably fixed on the axle. To the sleeve 30 is secured the lower end of the lower tubular section 32 of a telescopic prop. In the upper end of the tube 32 is fixed, as by welding, a liner 33 formed with a bayonet slot 34 extending through the lower extremity thereof. The liner receives the lower end of the next upper tubular prop section 35 which carries at its lower end a pin 36 working in the bayonet slot 34. The section 35 is supported in its upper or extended position by reception of the pin in the lateral portion of the slot 34 and is dropped into the section 32 by moving the pin to the vertical leg of the slot. In the lower end of the section 32 is supported a sleeve or boss 37 adapted to be received in the section 35 when dropped. From the upper end of the boss 37 is formed a bayonet slot 38 serving a purpose that will presently be described.

The uppermost section of the telescopic prop is a rod 39 slidably mounted in a liner 40 secured in the upper end of the section 35. The lower end of the rod 39 carries a pin 41 working in a bayonet slot 42 formed in the lower portion of the liner 40 and extending through the lower extremity thereof. The rod 39 is supported in its extended position by insertion of the pin 41 in the lateral portion of the slot 42 and is dropped on bringing the pin to the vertical portion of the slot.

The upper frame of the perambulator is a U-shaped member 43 lying normally in a horizontal plane and having its back secured to the upper end of the rod 39. The attachment is made in any suitable manner and may consist, as shown, of a sleeve 44 on the rod 39 pivotally receiving the back of the member 43, the latter having fixed collars 45 at the ends of the sleeve 44 to prevent sliding. The cross brace 24 is secured to the posts 20 at approximately the level of the upper frame 43. At the same level, brackets 47 extend forwardly from the posts 20 and receive the flattened ends 48 of the frame 43, which are pivotally held by pins 49.

Each post 20 carries another inwardly extending bracket 50 near its upper end as shown in Figs. 1, 8 and 9. Each such bracket is attached to the adjacent side of the frame 43 by a hanger consisting of a pair of links 51, 52 pivotally attached together in overlapping relation at one end by a pin 53 and having their free ends pivotally attached respectively to the bracket 50 and the side of the frame 43 by pins 54, 55 respectively. The overlapping end of one of the links carries a finger 56 adapted to enter a notch 57 in the overlapping end of the other link. In order to prevent buckling of the links in the upward direction, the overlapping ends thereof are enclosed in a slidable sleeve 58. The rear end of the sleeve has a lug 59 engaging the rear end of the links 52 to hold the sleeve from sliding forward. However, the sleeve may be slid rearward to uncover the joint and thereby permit the latter to be buckled upwardly for collapsing the device, as will presently be shown.

The rear ends of the frame 43 carry inwardly extending brackets 60 (Fig. 3) to which is attached the stiff back 61 of a back cushion pad 62. From the sides of the frame 43 is suspended a fabric sling 63 in which is laid a seat cushion 64, having a forward central projection 65. A fabric hinge 66 joins the lower edge of the back 61 to the rear edge of the cushion 64. A crotch strap 66' has its upper end wrapped around the sleeve 44 and collars 45 and has its lower end fastened beneath the forward edge of the seat cushion 64.

In collapsing the device from the position shown in Fig. 1 to that shown in Fig. 12, the sleeves 58 are first retracted in order to permit the articulated links 51, 52 to buckle in the manner described. The telescopic prop 32—39 is then adjusted so that the sections thereof will slip one into the other. This is accomplished by turning the intermediate section 35 clock-wise as viewed in Fig. 5, for which purpose the upper end of the section may be provided with a knurled gripping ring 67. By this operation the pin 36 is brought to the vertical part of the bayonet slot 34, and the vertical part of the slots 42 in the liner 40 is brought to the pin 41.

The legs 10 are then swung forward until the arm 8 is inserted in the clip 16.

The axle 1 is then pushed forward so that the lower frame 2—3 swivels on the cross member 14. The approaching movement of the lower frame toward the posts 20 is limited only by the mutual engagement of the cushions 62—64 as shown in Fig. 11. During this movement the telescopic prop 32—39 is shortened and the articulated links 51, 52 buckle upwardly. In this connection each link 52 is formed with an inward bend or offset 68 (Fig. 8) to provide clearance for accommodating the link 51 in a laterally adjacent position.

The device can be made more compact than shown in Fig. 11 by swinging the handle bars 22 into the general plane of the collapsed structure, as shown in Fig. 10. This is accomplished by retracting the pins 25, turning the handles 90° and finally locking them at the apertures 29 in the manner already described.

With the handle bars 22 extended as in Fig. 11, the collapsed device may be hung on a support such as a rail or conveniently carried on the arm of a person. The 90° displacement of the handle bars provides a more compact package for shipping and storing.

An intermediate adjustment for an infant's automobile seat is obtained by bringing the frame 2—3 into approximately parallel relation to the upper frame 43, with a corresponding shortening of the telescopic prop 32—39 and swinging the arm 8 into the clip 16. This adjustment of the prop is maintained by the reception of the arm 8 in the clip 16. In this condition the handle bars 22 may be hooked over the back of an automobile seat, while the forward wheels 6 and the rear wheels 12 clear the seat to present no interference therewith. A comfortable automobile seat for an infant is thereby provided. Should the suspended seat be urged forward and somewhat downward by momentum or abrupt slowing or stopping of the automobile, the downward movement will be limited by the engagement of the forward wheels 6 with the automobile seat. In this adjustment and in the ambulatory adjustment shown in Fig. 1, an infant cannot readily lift himself out of the seat because of the position of his legs in the openings formed by the sling 63 at each side of the crotch strap 66'.

While we have described a satisfactory constructional example of the present invention, it will be understood that many changes, variations and modifications of the specific constructional details may be resorted to without departing from the spirit of the appended claims.

We claim:

1. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a seat supported by said upper frame, a rear wheel assembly carried by said bottom frame.

2. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a seat supported by said upper frame, a rear wheel assembly pivotally carried by the bottom frame and extending rearwardly from its pivot point in the operative position of the device, said assembly being swingable to extend forward of its pivot point in the collapsed position of the device.

3. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a seat supported by said upper frame, a rear wheel assembly pivotally carried by the bottom frame and extending rearwardly from its pivot point in the operative position of the device, said assembly being swingable to extend forward of its pivot point in the collapsed position of the device, and clips carried by said bottom frame at opposite sides of said pivot point for holding said assembly in either position.

4. A collapsible perambulator comprising a front axle, wheels carried thereby, a bottom frame pivotally attached to said axle and extending rearwardly therefrom, a post structure pivotally attached to the rear portion of said frame and extending upwardly therefrom, a telescopic prop pivotally attached to said axle and extending upwardly therefrom, an upper frame pivotally mounted on said prop and post structure, a seat supported by said upper frame, a rear wheel assembly carried by said bottom frame.

5. A collapsible perambulator comprising a front axle, wheels carried thereby, a bottom frame pivotally attached to said axle and extending rearwardly therefrom, a post structure pivotally attached to the rear portion of said frame and extending upwardly therefrom, a handle structure carried by said post structure, a collapsible prop pivotally attached to said axle and extending upwardly therefrom, an upper frame pivotally mounted on said prop and post structure, a seat supported by said upper frame, a rear wheel assembly carried by said bottom frame.

6. In a collapsible perambulator, the sub-combination comprising a pair of rearward hollow posts, a handle rotatably mounted in each post, each handle having a curved external upper and constituting a handle bar, each handle having a longitudinal series of notches in the portion thereof within the post, and a pin passing through each post for selective reception in the notches of the corresponding handle.

7. In a collapsible perambulator, the sub-combination comprising a pair of rearward hollow posts, a handle rotatably mounted in each post, each handle having a curved external upper end constituting a handle bar, each handle having a longitudinal series of notches in the portion thereof within the post, and a pin passing through each post for selective reception in the notches of the corresponding handle, each handle having an aperture displaced 90° from one of said notches, said pins being receivable respectively in said apertures.

8. In a collapsible perambulator, the sub-combination comprising a pair of rearward hollow posts, a handle rotatably mounted in each post, each handle having a curved external upper end constituting a handle bar, each handle having a longitudinal series of notches in the portion thereof within the post, a cross brace secured to and between said posts, a pair of pins slidably mounted at the ends of said brace and adapted for selective reception in said notches, spring means normally holding said pins in said notches, and means for withdrawing said pins against said spring means.

9. In a collapsible perambulator, the sub-combination comprising a pair of rearward hollow posts, a handle rotatably mounted in each post, each handle having a curved external upper end constituting a handle bar, each handle having a longitudinal series of notches in the portion thereof within the post, a cross brace secured to and between said posts, a pair of pins slidably mounted at the ends of said brace and adapted for selective reception in said notches, spring means normally holding said pins in said notches, a sleeve slidably mounted on said brace, and projections from said sleeve passing slidably through said brace and having a thrust engagement with said pins for withdrawing said pins against said spring means.

10. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a seat supported by said upper frame, a rear wheel assembly carried by said bottom frame, and articulated braces between said post structure and the sides of said upper frame.

11. In a collapsible perambulator, the sub-combination comprising a front axle, an upper seat-supporting frame, and a collapsible prop having its ends pivotally attached respectively to said axle and frame.

12. In a collapsible perambulator, the sub-combination comprising a front axle, an upper seat-supporting frame, and a telescopic prop having its ends pivotally attached respectively to said axle and frame.

13. In a collapsible perambulator, the sub-combination comprising a front axle, an upper seat-supporting frame, and a collapsible prop having its ends pivotally attached respectively to said axle and frame, said prop including telescopic sections, and means for locking adjacent sections together in the extended position.

14. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a rear wheel assembly carried by said bottom frame, a sling suspended from said upper frame, and a seat mounted in said sling.

15. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a rear wheel assembly carried by said bottom frame, a sling suspended from said upper frame, a seat cushion mounted in said sling, and a back cushion supported by said upper frame.

16. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a rear wheel assembly carried by said bottom frame, a sling suspended from said upper frame, a seat mounted in said sling, and a strap suspended from the forward portion of said upper frame and attached to the forward edge of said seat.

17. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a seat supported by said upper frame, a rear wheel assembly carried by said bottom frame, means for securing said prop in an intermediate collapsed position, and hooked suspension handles carried by said post structure.

18. A collapsible perambulator comprising a front axle, wheels carried thereby, a bottom frame pivotally attached to said axle and extending rearwardly therefrom, a post structure pivotally attached to the rear portion of said frame and extending upwardly therefrom, a collapsible prop pivotally attached to said axle and extending upwardly therefrom, an upper frame pivotally mounted on said prop and post structure, a seat supported by said upper frame, a rear wheel assembly carried by said bottom frame, a collapsible structure pivotally attached to said axle and extending upwardly therefrom, an upper frame pivotally mounted on said post and collapsible structures, a seat supported by said upper frame, a rear wheel assembly carried by said bottom frame, means for securing said collapsible structure in an intermediate collapsed position, and hooked suspension handles carried by said post structure.

JAMES D. MACKIN.
ERICK W. BERGMANN.

REFERENCES CITED

The following references are of record in the file of this patent:

UNITED STATES PATENTS

| Number | Name | Date |
| --- | --- | --- |
| 319,524 | Steel | June 9, 1885 |
| 655,787 | Leadbetter | Aug. 14, 1900 |
| 1,124,155 | Lloyd | Jan. 5, 1915 |
| 1,140,085 | Turner | May 18, 1915 |
| 2,314,659 | Peterson | Mar. 23, 1943 |

FOREIGN PATENTS

| Number | Country | Date |
| --- | --- | --- |
| 222,654 | Great Britain | Oct. 9, 1924 |
| 265,891 | Great Britain | Feb. 17, 1927 |

Certificate of Correction

May 10, 1949

Patent No. 2,470,040.

JAMES D. MACKIN ET AL.

It is hereby certified that errors appear in the printed specification of the above numbered patent requiring correction as follows:

Column 1, line 23, for the word "with" read *within*; column 6, line 58, claim 6, for "and" read *end*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*